(12) United States Patent
Weir

(10) Patent No.: US 8,916,764 B2
(45) Date of Patent: Dec. 23, 2014

(54) OUTPUT VOLTAGE RIPPLE CONTROL FOR A DC-DC POWER CONVERTER

(75) Inventor: Steven P. Weir, Petaluma, CA (US)

(73) Assignee: Xandex, Inc., Petaluma, CA (US)

( * ) Notice: Subject to any disclaimer, the term of this patent is extended or adjusted under 35 U.S.C. 154(b) by 877 days.

(21) Appl. No.: 13/101,796

(22) Filed: May 5, 2011

(65) Prior Publication Data

US 2011/0273152 A1    Nov. 10, 2011

Related U.S. Application Data

(60) Provisional application No. 61/332,120, filed on May 6, 2010.

(51) Int. Cl.
 G05F 1/10    (2006.01)
 H02M 3/158   (2006.01)
 H02M 1/14    (2006.01)

(52) U.S. Cl.
 CPC ........... *H02M 1/143* (2013.01); *H02M 3/158* (2013.01)
 USPC ........... 136/244; 323/222; 323/223; 323/271; 323/282; 323/299; 323/304; 307/45; 307/71; 307/80; 307/85

(58) Field of Classification Search
 CPC .............................. H02M 1/143; H02M 3/158
 USPC .......... 323/282; 232/222, 223, 271, 282, 299; 232/304; 136/244; 307/45, 71, 80
 See application file for complete search history.

(56) References Cited

U.S. PATENT DOCUMENTS

| 5,912,552 | A  | * | 6/1999  | Tateishi ........................ 323/285 |
| 7,176,667 | B2 | * | 2/2007  | Chen et al. .................... 323/282 |
| 2004/0095113 | A1 | | 5/2004  | Kernahan et al. |
| 2004/0257842 | A1 | | 12/2004 | Hui et al. |
| 2009/0323379 | A1 | | 12/2009 | De Rooij et al. |
| 2010/0071742 | A1 | * | 3/2010  | de Rooij et al. ............... 136/244 |

OTHER PUBLICATIONS

International Search Report and Written Opinion dated Jan. 18, 2012 issued in PCT Application No. PCT/US2011/035391 (10 pages) XANDP013.

* cited by examiner

*Primary Examiner* — Rexford Barnie
*Assistant Examiner* — Elim Ortiz
(74) *Attorney, Agent, or Firm* — Weaver Austin Villeneuve & Sampson LLP

(57) ABSTRACT

An output ripple voltage average amplitude of a switch mode DC-DC converter is dynamically maintained. The converter has a switch and an output filter. By varying a switching period ($T_{PERIOD}$) of the switch, $V_{RIPPLE}$ is maintained at a substantially constant value over a first range of converter input voltages and a second range of switch duty cycles. Where the output filter includes an inductor having inductance (L) and a capacitor having capacitance (C) the average amplitude of $V_{RIPPLE}$ is dynamically maintained by varying $T_{PERIOD}$ with respect to switch duty cycle (D) and input voltage ($V_{IN}$) so as to approximately satisfy the following relationship: $T_{PERIOD} = (V_{RIPPLE}*8*L*C)^{0.5}/(V_{IN}*(D-D^2))^{.5}$.

19 Claims, 13 Drawing Sheets

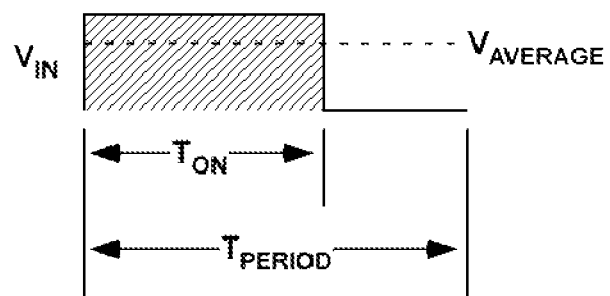
$$V_{AVERAGE} = V_{IN} * T_{ON} / T_{PERIOD}$$
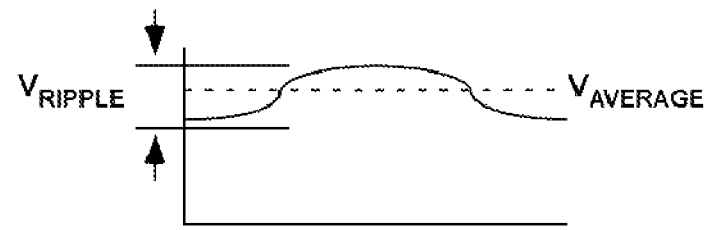
FIG 2 PRIOR ART

FIG. 4—PRIOR ART

Output Power Versus Output Current, PV Module Driving Ideal Buck DC-DC Converter

|T_PERIOD_DIFFERENCE > T_ON_DIFFERENCE|
Example Interpolation Low Slope $|T_{PERIOD\_DIFFERENCE} < T_{ON\_DIFFERENCE}|$
Example Interpolation Steep Slope

OUTPUT VOLTAGE RIPPLE CONTROL FOR A DC-DC POWER CONVERTER

RELATED APPLICATION DATA

The present application claims priority under 35 U.S.C. 119(e) to U.S. Provisional Patent Application No. 61/332,120, filed May 6, 2010, the entire disclosure of which is incorporated herein by reference for all purposes.

FIELD OF THE INVENTION

The present invention relates to output voltage ripple control of a DC-DC power converter, particularly in a photovoltaic (PV) application.

BACKGROUND

Conventionally, switch mode DC-DC power converters, such as "buck" converters have output filters to maintain output voltage ripple within an acceptable range. Referring to FIG. 1, a buck topology DC-DC power converter 100 conventionally has an input voltage source 101, a series power switch 102, and an output voltage averaging filter 110. Filter 110 consists of inductor 105 in series with a load (not shown), and capacitor 107, in parallel with the load.

Referring still to FIG. 1, series power switch 102 alternates connection of output averaging filter 110 between the two sides ($V_{IN}$ and common) of input voltage source 101. As illustrated in FIG. 2, filter 110 substantially suppresses the periodic components of the switching waveform, yielding an approximately DC voltage equivalent to the time average of the input voltage multiplied by the duty cycle of power switch 102. The time constant of filter 110 determines attenuation of the periodic switching waveform frequency components, whereas the output impedance of filter 110 is determined by the relative values of inductor 105 and capacitor 107. A choice of filter components represents a compromise between the size and cost of the constituent components and the filter response.

Referring still to FIG. 2, under steady-state conditions of continuous inductor conduction, current through inductor 105 increases during period $T_{ON}$, when the power switch 102 connects filter 110 to $V_{IN}$, and decreases during the remainder of $T_{PERIOD}$, when switch 102 connects filter 110 to circuit common.

Referring now to FIG. 3, a buck topology DC-DC power converter 300 may be configured with MOSFET switch 302 and voltage rectifier (diode) 303. In the illustrated configuration, where voltage rectifier 303 includes only a passive diode, current can only flow through the inductor 105 into the output. When the magnetic field in inductor 105 reaches zero, the voltage drop across inductor 105 collapses and diode 303 blocks reverse current.

Continuous inductor conduction requires a minimum output load current for any combination of input voltage, output voltage, and duty-cycle. Referring now to FIG. 4, a configuration is illustrated where voltage rectifier 403 includes switch 403A, capable of conducting current in both the first and third quadrants, in parallel with diode 403B. In the illustrated configuration, inductor 105 can conduct reverse currents from output capacitor 107 back to the common, and therefore support both zero and negative average output current each cycle.

Voltage ripple across output capacitor 107 may be determined from the observation that for half of the $T_{ON}$ and half of the $T_{OFF}$ periods, inductor current exceeds $I_{OUT}$. During these time intervals, charge accumulates on output capacitor 107, increasing the output voltage from its minimum to maximum value. The current into output capacitor 107 consists of two components:

1. Integral over the interval t from $T_{ON}/2$ to $T_{ON}$ of: $(V_{IN}-V_{OUT})/L$ dt
2. Integral over the interval t from $T_{ON}$ to $T_{OFF}/2$ of: $T_{ON}*(V_{IN}-V_{OUT})/(2*L)-(V_{OUT1}/L)$dt, where, $V_{OUT1}$ is the sum of the output voltage and any voltage drop across switch 102A.

The voltage developed across output capacitor 107 is the sum of the total charge, i.e., the time integral of current, deposited on output capacitor 107 during these two intervals divided by its capacitance. For the ideal case where $V_{OUT1}=V_{OUT}$ and there are no dissipative losses:

$$V_{RIPPLE}=(T_{ON}^2*(V_{IN}-V_{OUT})+2*T_{OFF}*T_{ON}*(V_{IN}-V_{OUT})-T_{OFF}^2*V_{OUT})/(8*L*C)$$

$$V_{RIPPLE}=T_{PERIOD}^2/(8*L*C)*V_{OUT}*(1-V_{OUT}/V_{IN})$$

From the above equations, it may be observed that $V_{RIPPLE}$ approaches zero as $V_{OUT}$ either approaches zero or approaches $V_{IN}$, while the maximum ripple occurs when $V_{OUT}=0.5*V_{IN}$.

In typical DC-DC converter applications, acceptable output ripple is a defined fraction of the output voltage. Conventionally, selection of the L-C filter time constant is based on the acceptable output ripple for the worst-case condition of the idealized converter where:

$$V_{RIPPLE\_MAXIMUM}/V_{OUT}=T_{PERIOD}^2/(16*L*C)$$

$$L*C/T_{PERIOD}^2=V_{OUT}/(16*V_{RIPPLE})$$

In cases where the duty-cycle is restricted to operate only above 50%, or only below 50%, the value of $L*C$ ratio to $T_{PERIOD}^2$ may be reduced to satisfy the worst-case which will be the duty-cycle value closest to 50%.

DC-DC converters may be used in photovoltaic (PV) applications to condition the output of photovoltaic strings or substrings. In such applications, additional requirements for acceptable output ripple, distinct from those described above, may apply. These requirements may vary depending on whether a DC-DC converter conditions the output of each PV module/sub-string in a given string as opposed to when DC-DC converters are selectively installed only between some modules/sub-strings and the PV string.

Referring now to FIG. 5, a configuration is illustrated in which an output of each and every PV substring/module 511 . . . 515 in PV string 500 connects to a respective DC-DC converter 521 . . . 525. Ripple voltages 531 . . . 535 from each converter 521 . . . 525 add through string 500, as does the output impedance 541 . . . 545 of each converter 521 . . . 525. The input impedance 551 of a load inverter 550 attenuates the voltage ripple seen at load inverter 550 as the ratio of the impedance 551 divided by the sum of DC-DC converter output impedances 541 . . . 545, and the string wiring impedance 590. Where the noise voltage of each DC-DC converter is uncorrelated, noise voltage adds statistically as the root mean square sum. As a result, a string with sixteen DC-DC converters exhibits an RMS ripple noise four times the ripple of a single converter.

Referring now to FIG. 6, a more typical PV string configuration is illustrated. PV string 600 is configured such that only some of the PV substrings/modules (for example, PV substring 511, connected to DC-DC converter 521) are "buffered" (i.e., have an output connected to a DC-DC converter). An output of at least one other PV substring (for example, PV substring 515) is "unbuffered" (i.e., has an output connected directly to string 600). For such configurations, cumulative DC-DC converter ripple voltage divides between the DC-DC converter output impedances, (for example, 541), wiring impedance 590, inverter input impedance 551, and the effective PV substring/module impedance (for example, 545) of each substring connected directly to the string at a particular DC current operating point.

PV substring/module impedance 545 as a function of DC current is very non-linear. The equivalent impedance of a PV cell typically varies from a minimum value at the open circuit voltage ($V_{OC}$) to a much higher value at short circuit current. Ripple voltage from DC-DC converter 521 modulates the voltage operating point of unbuffered PV substrings/modules (for example, 515). In the normal operating region of a PV substring, near its maximum power point ("MPP"), such modulation reduces the harvestable power from the raw PV substrings/modules. For example, as illustrated in FIG. 7, power output percentage of MPP for mono and multi-crystalline silicon solar cells typically remain at or above 99% only while peak-to-peak ripple is not greater than 6% of $V_{OC}$. These same cells typically hold at or above 97% only while peak-to-peak ripple is not greater than 11% of $V_{OC}$.

For a string composed of PV substrings/modules of the same or similar $V_{OC}$ characteristics, that include both DC-DC converter buffered, and unbuffered substrings/modules, the relationship between individual DC-DC converter ripple and $V_{MPP}$ modulation of the unbuffered substrings/modules is:

$$V_{RIPPLE\_RMS\_EACH\_MODULE} = X^{0.5} * V_{RIPPLE\_DC\_DC} / (N-X)$$

Where:

N is the number of substrings/modules in the string.

X is the number of DC-DC converter buffered modules.

$V_{RIPPLE\_DC\_DC}$ is the peak to peak ripple voltage at the output of each converter.

$V_{RIPPLE\_RMS}$ reaches a maximum at X=N−1 of:

$$V_{RIPPLE\_RMS} = (N-1)^{0.5} * V_{RIPPLE\_DC\_DC}$$

A further consideration is the interaction between maximum power point (MPP) control in each DC-DC converter and an MPP control loop of load inverter 510. Referring now to FIG. 8, inverter MPP regulation algorithms are conventionally designed to detect MPP as a relatively sharp peak in power as a function of, for example, current as illustrated by curve 801. A fully buffered PV string presents the central inverter with a very different transfer function depicted by curve 802. An ideal DC-DC converter transforms input power to output power at negligibly low, and, therefore, effectively constant, loss. As a result, the power versus current curve is flattened for currents greater than MPP. Such a broad, flat response can destabilize the MPP control loop of load inverter 510, resulting in oscillations that periodically take operation beyond the flat section to the sharp power inflection just before load current rises to the point that output power abruptly collapses.

Thus, improved techniques for regulating switch mode DC DC power converter output voltage are needed.

SUMMARY OF THE INVENTION

The present inventor has recognized that ripple of an output voltage of a switch mode DC-DC converter may be dynamically controlled so as to maintain the ripple voltage average amplitude at a substantially constant value over a range of converter input voltages and output voltages, by varying a switching period of the converter.

In an embodiment, an output ripple voltage ($V_{RIPPLE}$) average amplitude of a switch mode DC-DC converter is dynamically maintained. The converter may be configured to be disposed between a power source and a load. The converter may include a switch and an output filter. By varying a switching period ($T_{PERIOD}$) of the switch, $V_{RIPPLE}$ ma be maintained at a substantially constant value over a first range of converter input voltages and a second range of switch duty cycles.

In another embodiment, the ripple voltage average amplitude is controlled to be less than a selected level. For example, the selected level may be 5% peak to peak of at least one of a nominal converter input voltage a nominal converter output voltage, or the selected level may be 0.5 V peak to peak.

In a further embodiment, the power source may be a photovoltaic substring.

In an embodiment, the converter may be a buck converter.

In another embodiment, the output filter includes an inductor having inductance (L) and a capacitor having capacitance (C) and the average amplitude of $V_{RIPPLE}$ is dynamically maintained by varying $T_{PERIOD}$ with respect to switch duty cycle (D) and input voltage ($V_{IN}$) so as to approximately satisfy the following relationship:

$$T_{PERIOD} = (V_{RIPPLE} * 8 * L * C)^{0.5} / (V_{IN} * (D - D^2))^{0.5}$$

In a further embodiment, normalized values may be pre-compiled and stored, in a respective look up table, where $TABLE_1(D) = K_1 / (D - D^2)^{0.5}$, and $TABLE_2(V_{IN}) = K_2 / (V_{in}^{0.5})$, and the average amplitude of $V_{RIPPLE}$ may be dynamically maintained by varying $T_{PERIOD}$ so as to approximately satisfy the following relationship:

$$T_{PERIOD} = K_3 * (TABLE_1(D)) * (TABLE_2(V_{IN})).$$

A value of $K_3$ may be selected so that units of $T_{PERIOD}$ scale directly into a digital count value. In addition, or alternatively, the value of $K_3$ may be selected so that units of $T_{PERIOD}$ scale into a digital-to-analog converter command word value representative of an interval threshold for a mixed-signal PWM ramp generator.

In an embodiment, a switch mode DC-DC converter includes a control module, a switch, and an output filter. The converter may be configured to be disposed between a power source and a load, and to deliver an output voltage to the load, the output voltage characterized by a ripple voltage ($V_{RIPPLE}$). The control module may be configured to vary a switching period ($T_{PERIOD}$) of the switch so as to dynamically maintain an average amplitude of ($V_{RIPPLE}$) at a substantially constant value over a first range of converter input voltages and a second range of switch duty cycles.

In an embodiment, the power source is a photovoltaic substring.

In another embodiment, the output filter includes an inductor having inductance (L) and a capacitor having capacitance (C) and the average amplitude of $V_{RIPPLE}$ may be dynamically maintained by varying $T_{PERIOD}$ with respect to switch duty cycle (D) and input voltage ($V_{IN}$) so as to approximately satisfy the following relationship:

$$T_{PERIOD} = (V_{RIPPLE} * 8 * L * C)^{0.5} / (V_{IN} * (D - D^2))^{0.5}.$$

In an embodiment, the first range of converter input voltages is 5 volts to 50 volts.

In a further embodiment, the first range of switch duty cycles is 10% to 100%.

In an embodiment, the converter is a boost converter.

In another embodiment, the converter is a buck-boost converter.

In an embodiment, a photovoltaic (PV) system includes a plurality of PV substrings, where each of a first subset of said PV substrings is buffered by a respective switch mode DC- DC converter, and at least one PV substring is unbuffered. At least one converter includes a control module, a switch, and an output filter, and is configured to deliver an output voltage to the load, the output voltage characterized by a ripple voltage ($V_{RIPPLE}$). The control module is configured to vary a switching period ($T_{PERIOD}$) of the switch so as to dynamically maintain an average amplitude of $V_{RIPPLE}$ at a substantially constant value over a first range of converter input voltages and a second range of switch duty cycles.

In another embodiment, the average amplitude of the ripple voltage is controlled to be less than a selected level.

In a further embodiment, the selected level limits ripple induced power harvest degradation of unbuffered PV substrings in mixed string configurations to a predefined worst-case limit.

In another embodiment, a switching frequency ($1/T_{PERIOD}$) is lowest when a PV substring buffered by the DC-DC converter is subject to approximately similar illumination level as other PV substrings in the system.

In further embodiment, the PV system includes a load connected to the plurality of PV substrings, the load comprising a power converter, wherein the switching frequency is varied so as to improve maximum power point tracking by the power converter by introducing an artificial slope in a power transfer function.

In yet another embodiment, the power converter is at least one of a central inverter and a battery charge controller.

In an embodiment, the DC-DC converter power transfer function is monotonic, nonlinear, and exhibits a higher initial slope for ratios of string current to DC-DC converter input current to unbuffered PV substring current marginally in excess of 1:1 and a decreasing slope for higher ratios.

BRIEF DESCRIPTION OF THE DRAWINGS

FIG. 2 illustrates output voltage characteristics of a buck converter.

DETAILED DESCRIPTION

Reference will now be made in detail to specific embodiments of the invention including the best modes contemplated by the inventor for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

The present inventor has recognized that output voltage ripple ($V_{RIPPLE}$) of a switch mode DC-DC converter may be dynamically controlled so as to maintain an average amplitude of $V_{RIPPLE}$ at a substantially constant value over a range of converter input voltages and output voltages, by varying a switching period of the converter. The DC-DC converter may include a control module, a switch, and an output filter.

Figure 1:
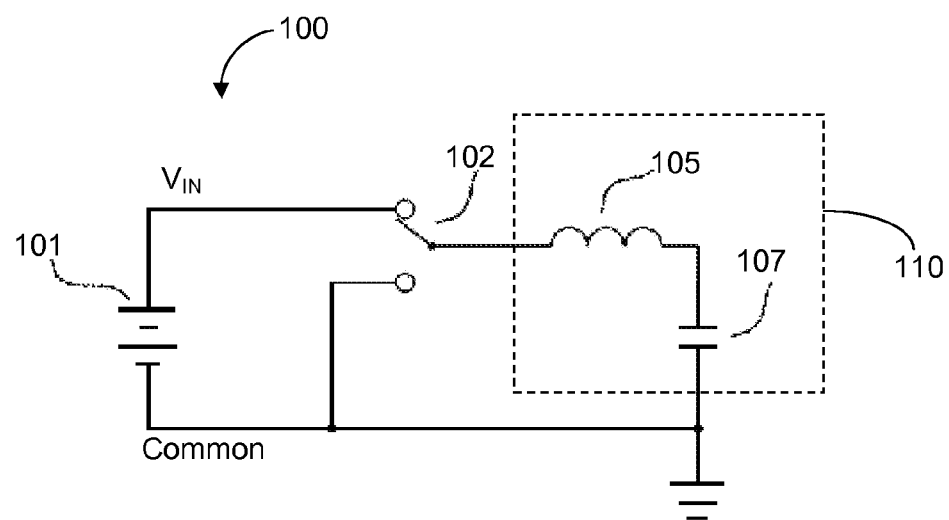
FIG. 1 illustrates a basic "buck" DC-DC converter of the prior art.
Figure 3:
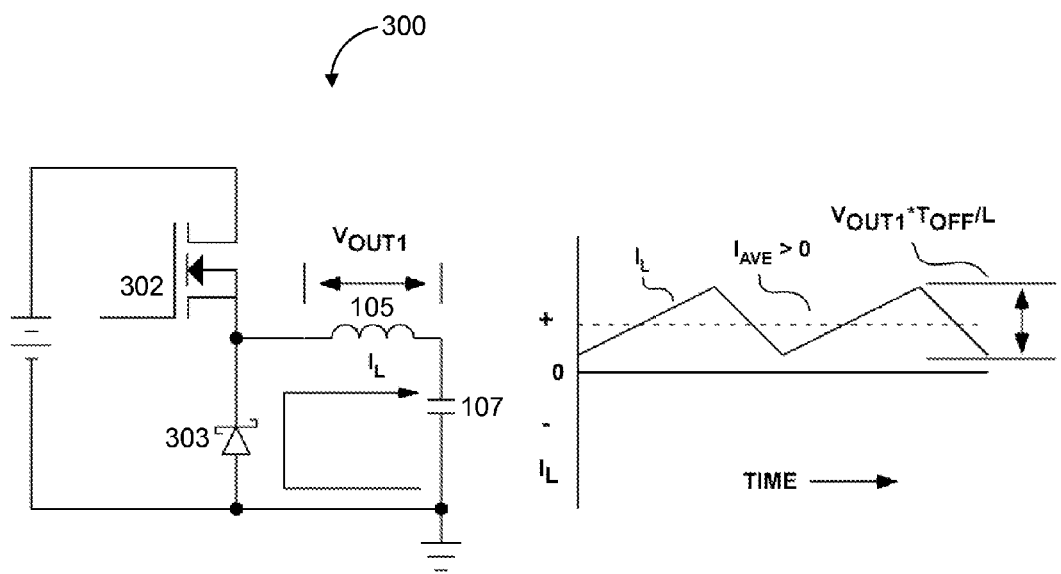
FIG. 3 illustrates a PWM switched buck converter with passive rectifier.
Figure 4:
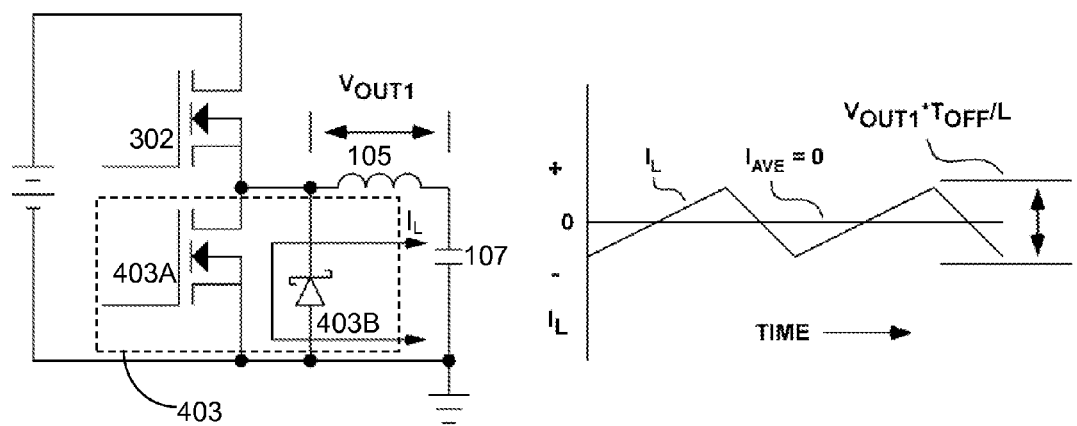
FIG. 4 illustrates a PWM switched buck converter with active rectifier.
Figure 5:
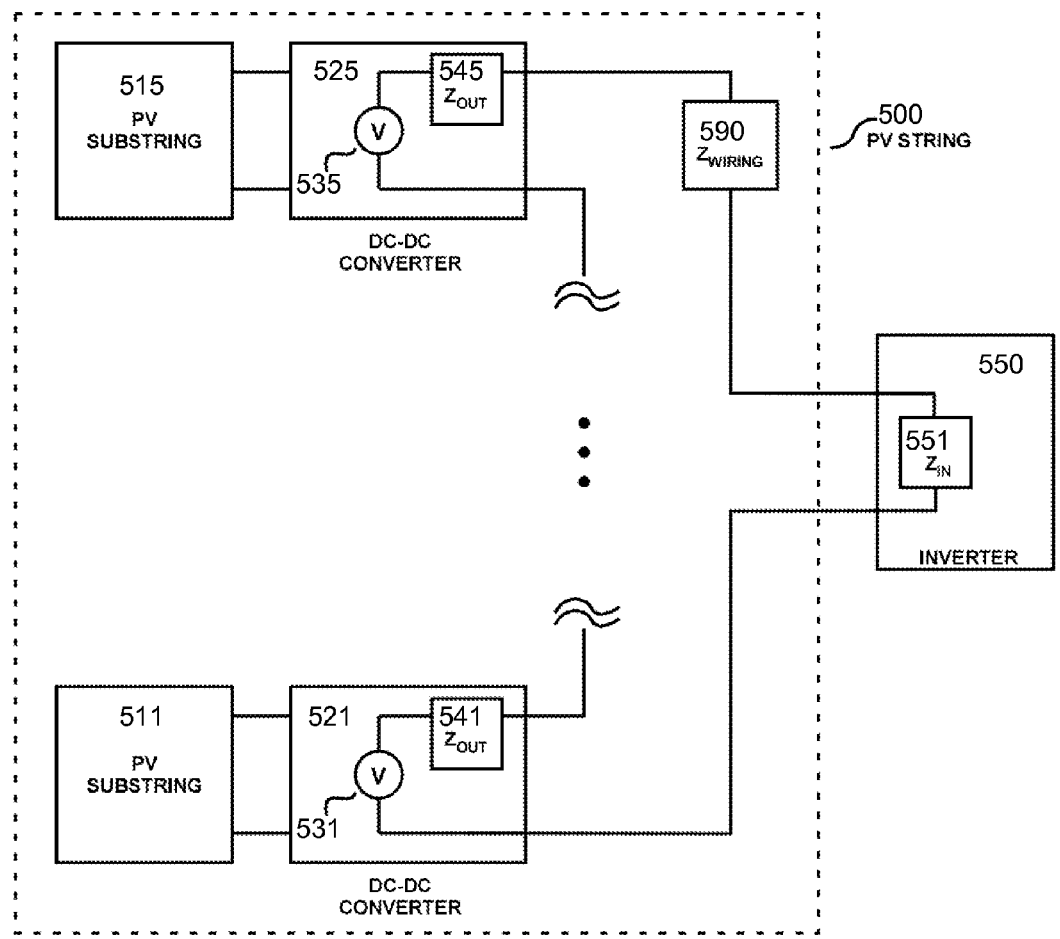
FIG. 5 illustrates a photovoltaic string with a dedicated DC-DC converter for each substring.
Figure 6:
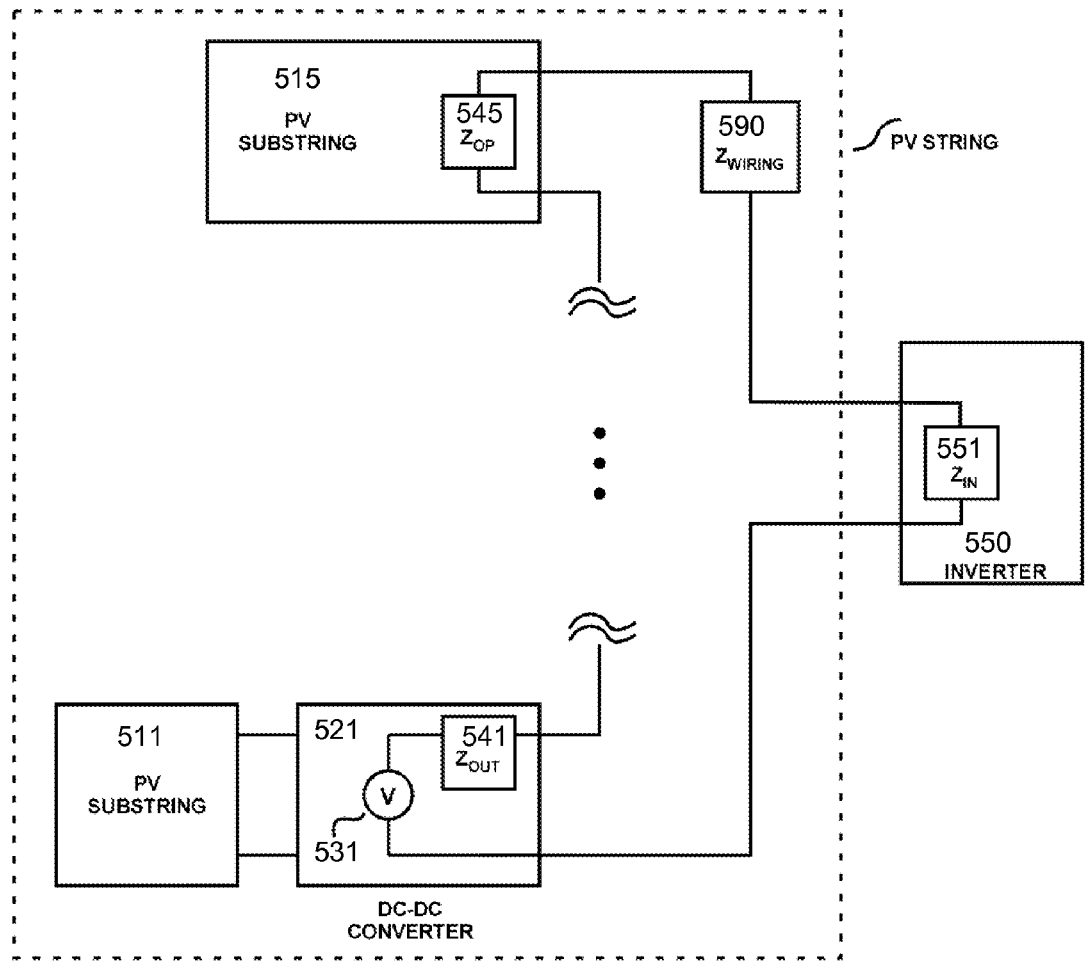
FIG. 6 illustrates a photovoltaic string with a dedicated DC-DC converter only for selected substrings.
Figure 7:
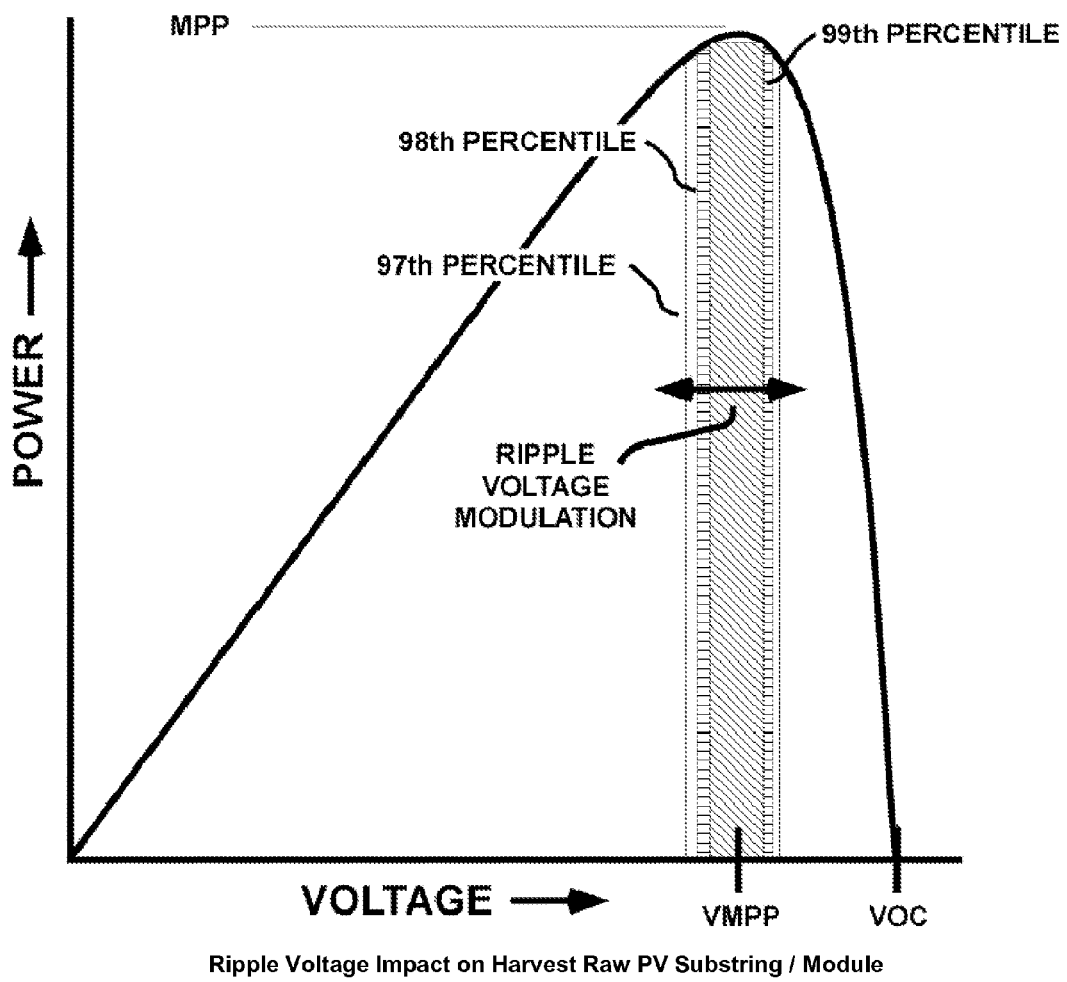
FIG. 7 illustrates the effect of DC-DC converter ripple voltage on power availability from unbuffered PV substrings.
Figure 8:
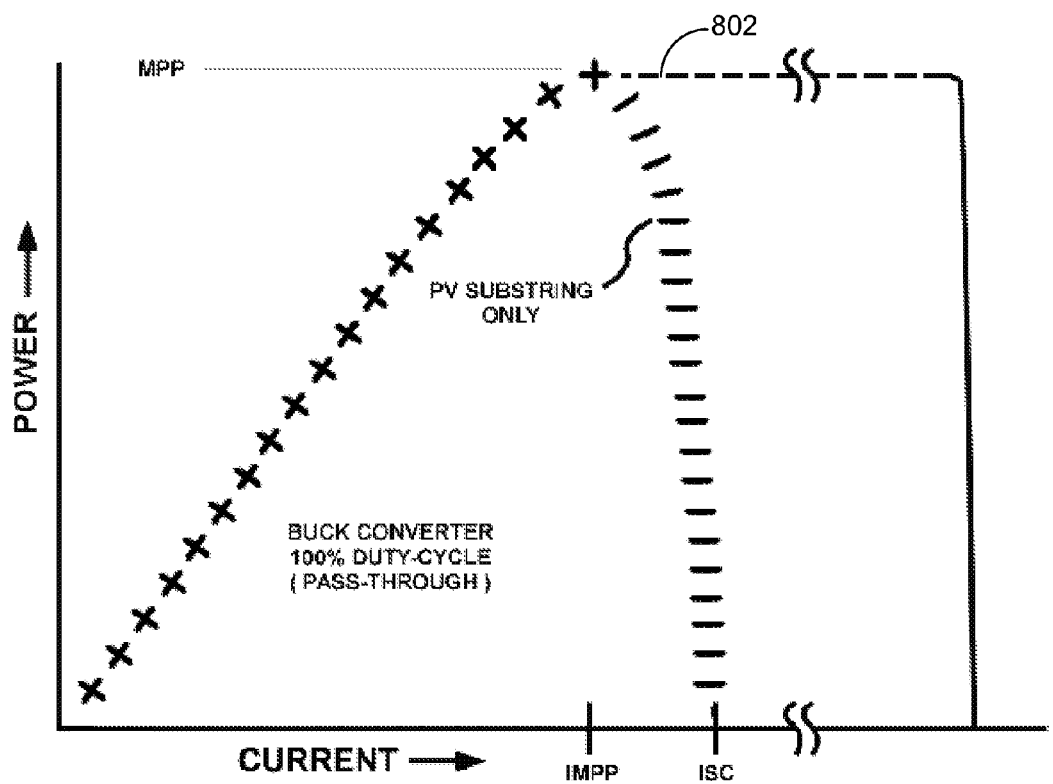
FIG. 8 illustrates power vs current curves for a DC-DC converter and for an unbuffered PV substring.
Figure 9:
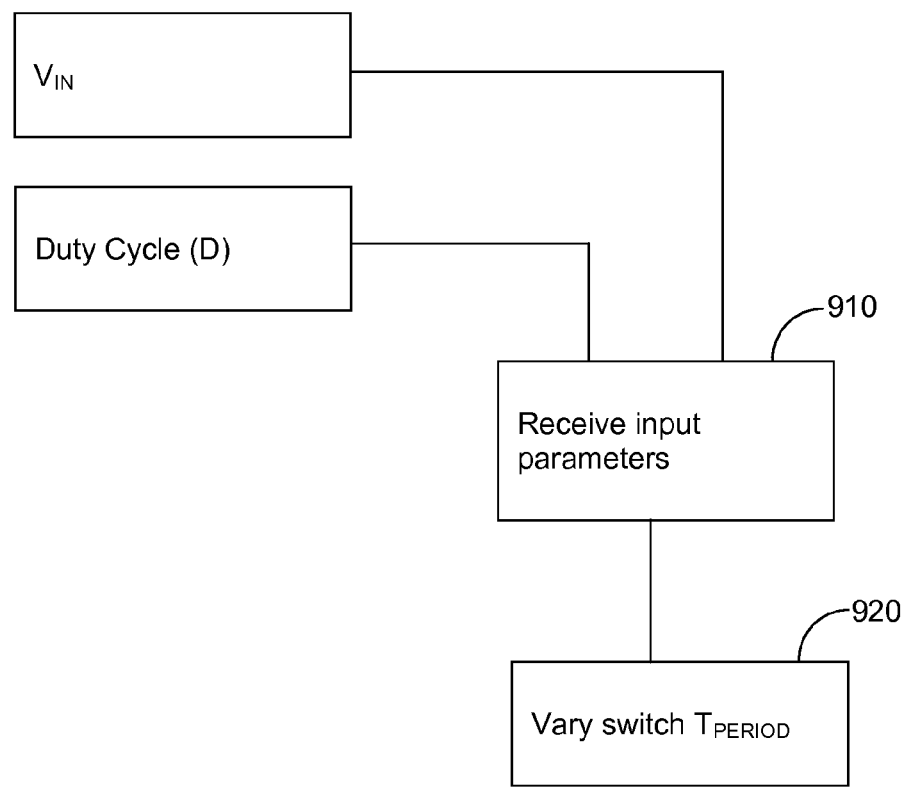
FIG. 9 is a flow chart illustrating a method embodiment.

Referring now to FIG. 9, in an embodiment, $V_{RIPPLE}$ may be dynamically controlled by receiving, step 910, as input parameters, values for input voltage ($V_{IN}$) to the DC-DC converter, and duty cycle (D) of the DC-DC converter, and varying, step 920, a switching period ($T_{PERIOD}$) of the switch. Advantageously, $T_{PERIOD}$ may be varied such that the average amplitude of $V_{RIPPLE}$ is maintained at a substantially constant value over a range of converter input voltages and output voltages. In an embodiment, output voltage ($V_{OUT}$) of the DC-DC converter may be received instead, or in addition to, duty cycle.

In an embodiment, step 920 may further comprise varying $T_{PERIOD}$ in view of characteristics of the output filter of the DC-DC converter. For example, where the output filter includes an inductor having inductance (L) and a capacitor having capacitance (C), $T_{PERIOD}$ may, advantageously, be varied to as to satisfy the following relationship:

$$T_{PERIOD}=(V_{RIPPLE}*8*L*C)^{0.5}/(V_{IN}*(D-D^2))^{0.5}. \qquad (1)$$

Because, in a buck converter, output voltage is closely approximated by the product of input voltage and duty cycle, equation (1) may, be expressed as:

$$T_{PERIOD}=(V_{RIPPLE}*8*L*C)^{0.5}/(V_{OUT}-V_{OUT}^2/V_{IN})^{0.5} \qquad (2);$$

or $$T_{PERIOD}=(V_{RIPPLE}*8*L*C)^{0.5}/(V_{OUT}-V_{OUT}*D)^{0.5} \qquad (3).$$

Advantageously, $V_{RIPPLE}$ may by controlled so as to be less than a selected level. The selected level may be predetermined, based, for example, on characteristics of a system in which the DC-DC converter is employed. Advantageously, for example, the selected level may be 5% peak to peak of a nominal converter input voltage and/or a nominal converter output voltage. As a further example, the selected level may be defined as an absolute limit, for example, 0.5 V peak to peak.

Figure 10:
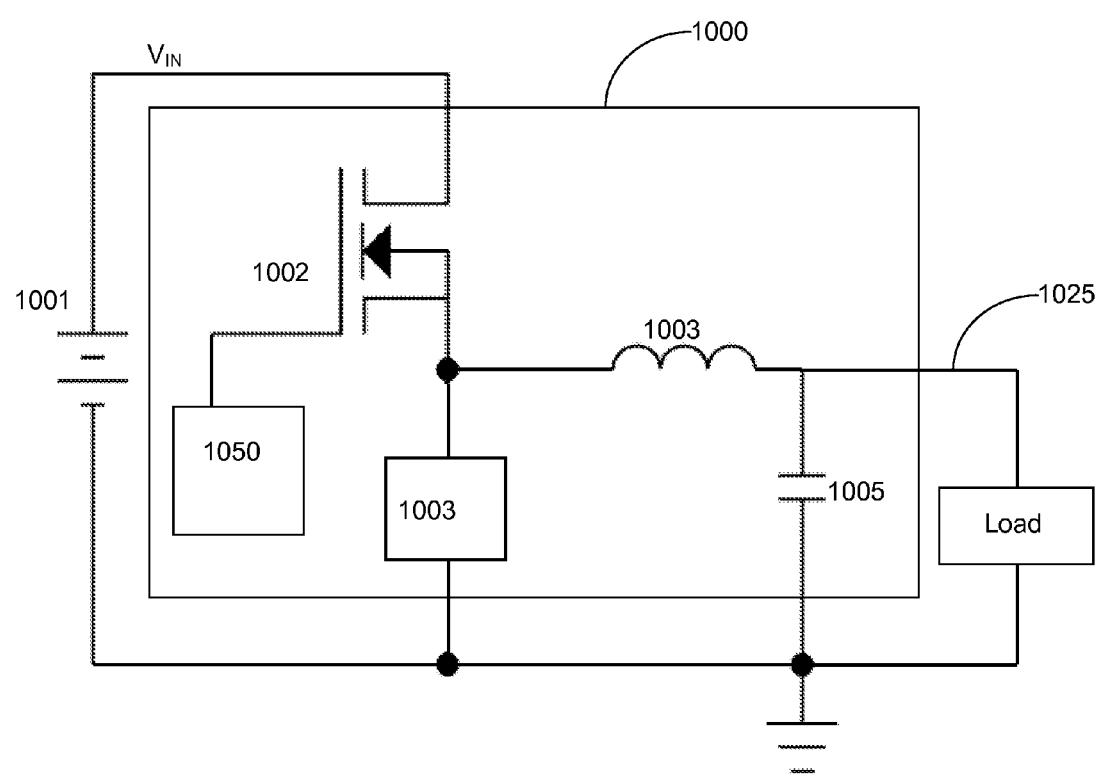
FIG. 10 illustrates a DC-DC converter, according to an embodiment.

Referring now to FIG. 10, an embodiment is illustrated wherein DC-DC converter 1000 is coupled with a control module 1050 that may be configured to vary $T_{PERIOD}$ of switch 1002 so as to dynamically control $V_{RIPPLE}$ at node 1025. Control module 1050 may be a dedicated device within or external to DC-DC converter 1000, or it may be a module of, for example, an electronic controller of DC-DC converter 1000. Advantageously, control module 1050 varies $T_{PERIOD}$ so as to maintain substantially constant value of $V_{RIPPLE}$, as measured, for example, at node 1025, over a first range of $V_{IN}$ and a second range of switch duty cycles.

In an embodiment, power source 1001 is a photovoltaic (PV) substring or module and the DC-DC converter may be a buck converter. Alternatively, and irrespective of the nature of power source 1001, the DC-DC converter may be boost converter, or a buck-boost converter, for example.

In particular, for buck and buck-boost topologies in the nominal case of full illumination of all PV substrings in PV string, the photo current of the substring attached to the DC-DC converter will be similar to the photo current of other PV substrings. The duty cycle in buck mode may, in such case, be close to 100%, and, in boost mode, close to 0%. For each of these cases output voltage ripple may be limited to a fixed value by appropriate control of the switching frequency.

Figure 11:
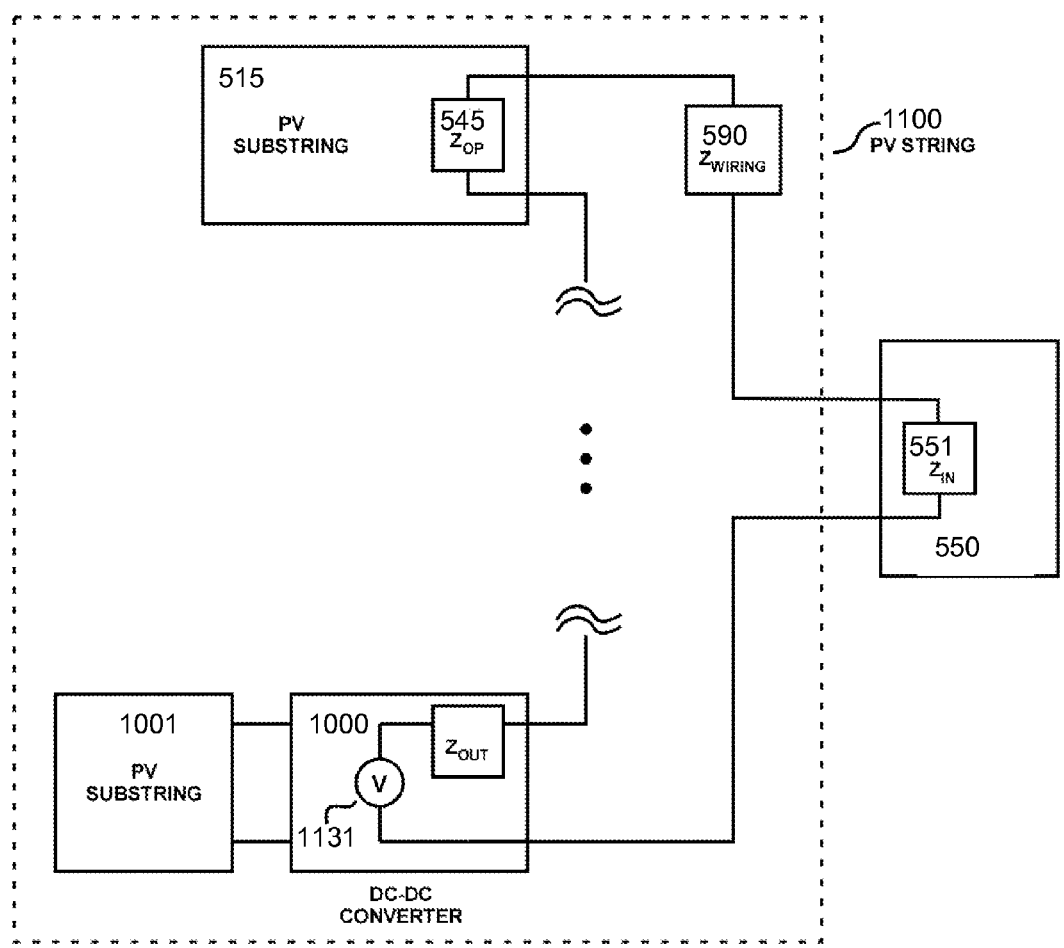
FIG. 11 illustrates a photovoltaic (PV) system according to an embodiment.

Referring now to FIG. 11, an embodiment is illustrated, where PV system (or "string") 1100 is configured such that a subset of PV substrings/modules are buffered. For example, PV substring 1001 is buffered by DC-DC converter 1000. An output of at least one other PV substring (for example, PV substring 515) may be unbuffered. In an embodiment, control module 1050 of DC-DC converter 1000 may vary $T_{PERIOD}$ of switch 1002 so as to dynamically maintain an average amplitude of $V_{RIPPLE}$ 1131 at a substantially constant value over a first range of converter input voltages and a second range of switch duty cycles.

In an embodiment, an average amplitude of $V_{RIPPLE}$ 1131 is controlled to be less than a selected level. Advantageously, the selected level limits ripple induced power harvest degradation of unbuffered PV substrings (e.g., substring 515) to a predefined worst-case limit.

Advantageously, a tracking stability function with respect to the maximum power point (MPP) of a PV string may be improved by an embodiment where at least one substring is buffered by a DC-DC converter. In an embodiment, for example, a small loss with respect to MPP may be contoured by the manipulation of switching loss, switching frequency, and/or conduction loss. For example, DC-DC converter switching frequency may be increased non-linearly in response to the ratio of actual string current to substring/module MPP current. Advantageously, switching frequency of ($1/T_{PERIOD}$) of switch 1002 may be lowest when a PV substring buffered by the DC-DC converter is subject to approximately similar illumination level as other PV substrings in the system.

Conduction loss of the DC-DC converter increases as a function of the ratio of unbuffered string current to the attached substring/module current into the DC-DC converter. In an embodiment, the combination of switching loss and conduction loss may be controlled such that total power harvest from the attached PV substring/module increases slightly and monotonically as the ratio of string current to PV substring/module current increases. For example, the DC-DC converter power transfer function may be controlled to be monotonic, nonlinear, and to exhibit a higher initial slope for ratios of string current to DC-DC converter input current marginally in excess of 1:1, and a decreasing slope for higher ratios. Moreover, the switching power loss versus string current to PV substring/module current may increase nonlinearly with an initially higher slope for ratios just greater than 1.0:1 and a decreasing slope for higher ratios.

In particular, for a string where most or all of the attached modules connect through DC-DC converters, and under conditions where the illuminated output of the individual PV substrings/modules is similar, this modified power transfer functionality mimics MPP transfer function of a passive PV string in the MPP region. Compared to PV strings with DC-DC converters that impose nearly linear loss for increasing ratios of string to substring/module current, this technique increases the closed loop gain near substring/module MPP and improves stability of the combined MPP tracking functions of the individual DC-DC converters and the central power converter.

In an embodiment, computational efficiency may be enhanced by precompiling and storing in look up tables normalized values. For example, look up tables, $TABLE_1$ and $TABLE_2$ may be predetermined as:

$$TABLE_1(D) = K_1/(D-D^2)^{0.5},$$

and $$TABLE_2(V_{IN}) = K_2/(V_{IN}^{0.5})$$

Advantageously, the average amplitude of $V_{RIPPLE}$ may then be dynamically maintained by varying $T_{PERIOD}$ so as to approximately satisfy the following relationship:

$$T_{PERIOD} = K_3 * (TABLE_1(D)) * (TABLE_2(V_{IN})).$$

$K_3$ may advantageously be selected so as to scale $T_{PERIOD}$ in units convenient to a particular application. In one embodiment, for example, $K_3$ may scale $T_{PERIOD}$ directly into period count register values. As a further example, $K_3$ may scale $T_{PERIOD}$ into digital-to-analog converter command word values representative of an interval threshold for a mixed-signal PWM ramp generator.

The techniques discussed above provide for varying the switching period so as to maintain a ripple voltage that is essentially constant independent of input or output voltages. In an embodiment, $T_{PERIOD}$ may be further limited between an upper bound value and a lower bound value:

$$T_{PERIOD\_LOWER\_BOUND} <= T_{PERIOD} <= T_{PERIOD\_UPPER\_BOUND}$$

$T_{ON}$ derives from the processed $T_{PERIOD}$ and duty cycle as $T_{ON} = T_{PERIOD} * D$.

A change to $T_{ON}$ or $T_{PERIOD}$ may transiently alter the effective duty-cycle from the steady-state value of $T_{ON}/T_{PERIOD}$. Resulting transients may pass attenuated through the DC-DC converter output filter and introduce additional unwanted voltage ripple. In an embodiment, therefore, additional unwanted voltage ripple may be minimized by ensuring that $T_{ON}$ and $T_{PERIOD}$ are only changed by small increments that are small. Advantageously, for example, during each movement from ($T_{ON1}$, $T_{PERIOD1}$) to ($T_{ON2}$, $T_{PERIOD2}$) the ratios of $T_{ON}$ and $T_{PERIOD}$ at each operating point approximate to linearly interpolated duty-cycle values between $T_{ON1}/T_{PERIOD1}$ and $T_{ON2}/T_{PERIOD2}$.

Figure 12:
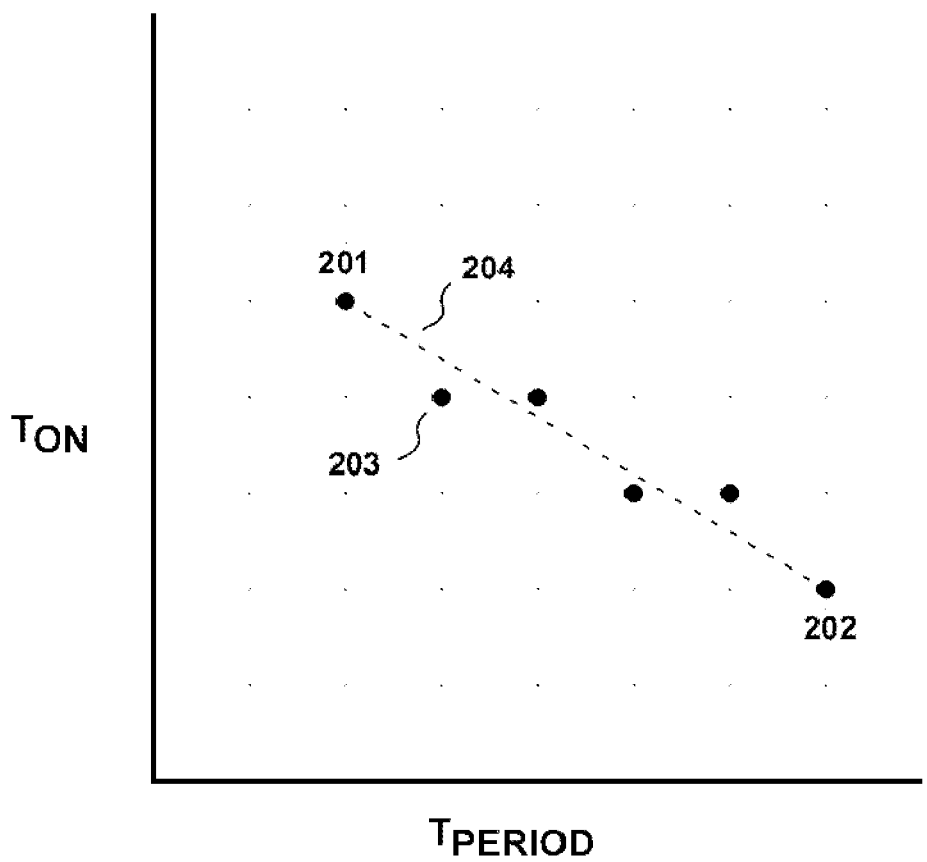
FIG. 12 illustrates an interpolation technique according to an embodiment.

FIG. 12 depicts interpolation for the case of $|T_{PERIOD\_DIFFERENCE}| >= |T_{ON\_DIFFERENCE}|$. Interpolation occurs between discrete endpoints 201 and 202. In this case $T_{PERIOD\_DIFFERENCE}$ assigns to the divisor and $T_{ON\_DIFFERENCE}$ assigns to the dividend. Ideally, interpolation follows slope 204. Interpolation points 203 occur at each discrete value of $T_{PERIOD}$ between the end points 201, and 202 exactly once.

Figure 13:
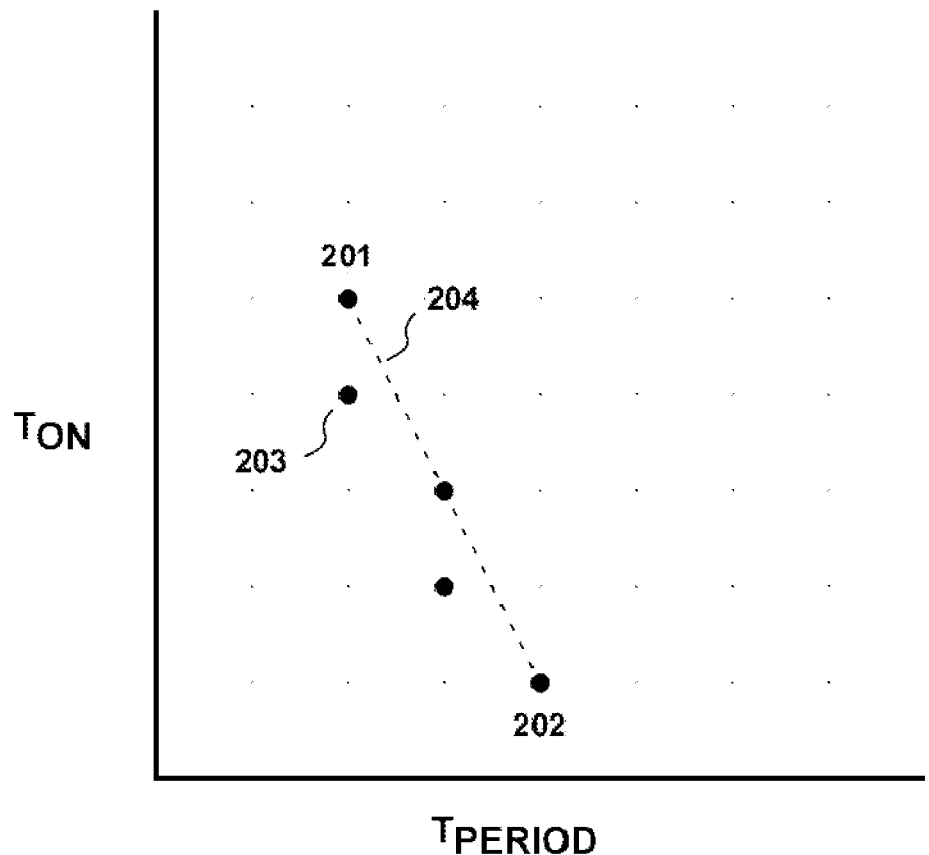
FIG. 13 illustrates an interpolation technique according to an embodiment.

FIG. 13 depicts interpolation for the complementary case where $|T_{PERIOD\_DIFFERENCE}| < |T_{ON\_DIFFERENCE}|$. Interpolation occurs between discrete endpoints 201 and 202. In this case $T_{PERIOD\_DIFFERENCE}$ assigns to the dividend and $T_{ON\_DIFFERENCE}$ assigns to the divisor. Ideally, interpolation follows slope 204. Interpolation points 203 occur at each discrete value of $T_{ON}$ between the end points 201, and 202 exactly once.

Thus, techniques have been disclosed for dynamically controlling ripple of an output voltage of a switch mode DC-DC so as to maintain the ripple voltage average amplitude at a substantially constant value over a range of converter input voltages and output voltages, by varying a switching period of the converter.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A method, comprising:
dynamically maintaining a ripple voltage ($V_{RIPPLE}$) average amplitude of a switch mode DC-DC buck converter output voltage ($V_{OUT}$), said converter configured to be disposed between a power source and a load, said converter comprising a switch and an output filter, by:
receiving, at a control module of the converter, a value for $V_{OUT}$ and for input voltage ($V_{IN}$) to the converter; and
varying, with the control module, a switching period ($T_{PERIOD}$) of the switch so as to maintain $V_{RIPPLE}$ at a substantially constant value over a first range of converter input voltages and a second range of switch duty cycles by varying $T_{PERIOD}$ with respect to $V_{OUT}$ and $V_{IN}$ so as to approximately satisfy the following relationship: $T_{PERIOD}=((V_{RIPPLE}*8*L*C)/(V_{OUT}-V_{OUT}^2/V_{IN}))^{0.5}$.

2. The method of claim 1, wherein the ripple voltage average amplitude is controlled to be less than a selected level.

3. The method of claim 2, wherein the selected level is 5% peak to peak of at least one of a nominal converter input voltage a nominal converter output voltage.

4. The method of claim 2, wherein the selected level is 0.5 V peak to peak.

5. The method of claim 1, wherein the power source is a photovoltaic substring.

6. The method of claim 1, further comprising:
precompiling and storing, within the control module, in a respective look up table, normalized values:

$TABLE_1(D)=K_1/(D-D^2)^{0.5}$, and $TABLE_2(V_{IN})=K_2/(V_{IN}^{0.5})$ wherein:

D approximately satisfies the relationship: $V_{OUT} = D*V_{IN}$, and
the average amplitude of $V_{RIPPLE}$ is dynamically maintained by varying $T_{PERIOD}$ so as to approximately satisfy the following relationship:

$T_{PERIOD}=K_3*(TABLE_1(D))*(TABLE_2(V_{IN}))$.

7. The method of claim 6, wherein a value of $K_3$ is selected so that units of $T_{PERIOD}$ scale directly into a digital count value.

8. An apparatus, comprising:
a switch mode DC-DC buck converter comprising a control module, a switch, and an output filter, the converter configured to be disposed between a power source and a load, wherein
the output filter includes an inductor having inductance (L) and a capacitor having capacitance (C);
the control module is configured to receive a value for converter output voltage ($V_{OUT}$) and for input voltage ($V_{IN}$) to the converter, and to vary a switching ($T_{PERIOD}$) of the switch so as to dynamically maintain an average amplitude of $V_{OUT}$ ripple voltage ($V_{RIPPLE}$) at a substantially constant value over a first range of converter input voltages and a second range of switch duty cycles by varying $T_{PERIOD}$ with respect to $V_{OUT}$ and $V_{IN}$ so as to approximately satisfy the following relationship: $T_{PERIOD}=((V_{RIPPLE}*8*L*C)/(V_{OUT}-V_{OUT}^2/V_{IN}))^{0.5}$.

9. The apparatus of claim 8, wherein the ripple voltage average amplitude is controlled to be less than a selected level.

10. The apparatus of claim 9, wherein the selected level is at least one of: 5% peak to peak of a nominal converter input voltage, 5% peak to peak of a nominal converter output voltage, and 0.5V peak to peak.

11. The apparatus of claim 8, wherein the power source is a photovoltaic substring.

12. The apparatus of claim 8, wherein the first range of converter input voltages is 5 volts to 50 volts.

13. The apparatus of claim 8, wherein the first range of switch duty cycles is 10% to 100%.

14. A photovoltaic (PV) system, comprising a plurality of PV substrings, wherein
each of a first subset of said PV substrings is buffered by a respective switch mode DC-DC converter, and at least one PV substring is unbuffered, at least one converter comprising a control module, a switch, and an output filter, and configured to deliver an output voltage to the load, the output voltage characterized by a ripple voltage ($V_{RIPPLE}$), wherein
the control module is configured to vary a switching period ($T_{PERIOD}$) of the switch so as to dynamically maintain an average amplitude of $V_{RIPPLE}$ at a substantially constant value over a first range of converter input voltages and a second range of switch duty cycles; and
a switching frequency ($1/T_{PEROID}$) is lowest when a PV substring buffered b the DC-DC converter is subject to approximately similar illumination level as other PV substrings in the system.

15. The PV system of claim 14, wherein the average amplitude of the ripple voltage is controlled to be less than a selected level.

16. The PV system of claim 14, wherein a switching frequency ($1/T_{PERIOD}$) is lowest when a PV substring buffered by the DC-DC converter is subject to approximately similar illumination level as other PV substrings in the system.

17. The PV system of claim 14, further comprising a load connected to the plurality of PV substrings, the load comprising a power converter, wherein the switching frequency is varied so as to improve maximum power point tracking by the power converter by introducing an artificial slope in a power transfer function.

18. The PV system of claim 17, wherein the power converter is at least one of a central inverter and a battery charge controller.

19. The PV system of claim 17, wherein the DC-DC converter power transfer function is monotonic, nonlinear, and exhibits a higher initial slope for ratios of string current to DC-DC converter input current marginally in excess of 1:1, and a decreasing slope for higher ratios.

* * * * *